United States Patent [19]

Randall, Jr. et al.

[11] 4,204,919

[45] May 27, 1980

[54] TREATING ETCHED ALUMINUM ELECTROLYTIC CAPACITOR FOIL

[75] Inventors: John J. Randall, Jr.; Walter J. Bernard, both of Williamstown, Mass.

[73] Assignee: Sprague Electric Company, North Adams, Mass.

[21] Appl. No.: 35,145

[22] Filed: May 2, 1979

[51] Int. Cl.$^2$ .............................................. C25D 11/16
[52] U.S. Cl. ........................................ 204/29; 204/33; 204/38 A; 148/6.27
[58] Field of Search .................... 204/29, 33, 38 A; 148/6.27; 29/570

[56] References Cited

U.S. PATENT DOCUMENTS

| | | |
|---|---|---|
| Re. 18,833 | 5/1933 | Clark . |
| Re. 28,015 | 5/1974 | Vermilyea et al. ............. 29/570 |
| 1,946,153 | 2/1934 | Edwards ........................... 148/6 |
| 2,126,954 | 8/1938 | Edwards ........................... 148/6 |
| 2,396,685 | 3/1946 | Coggins ......................... 156/639 |
| 2,853,445 | 9/1958 | Catotti et al. ................. 204/141 |
| 2,859,148 | 11/1958 | Altenpohl ...................... 148/6.27 |
| 2,981,647 | 4/1961 | Schwartz ........................ 148/6.14 |
| 4,113,579 | 9/1978 | Randall, Jr. et al. ............ 204/33 |

FOREIGN PATENT DOCUMENTS

| | | |
|---|---|---|
| 51-35050 | 3/1976 | Japan . |
| 518733 | 3/1940 | United Kingdom . |
| 1179486 | 1/1970 | United Kingdom . |

*Primary Examiner*—John H. Mack
*Assistant Examiner*—William Leader
*Attorney, Agent, or Firm*—Connolly and Hutz

[57] ABSTRACT

Aluminum electrolytic capacitor foil is treated prior to anodization in a two-step process in which a hydrous oxide film is first formed on the foil and the hydrous oxide is then modified. In the first step the foil is immersed in boiling water to form an appropriate thickness of hydrous oxide and in the second step it is immersed in a boiling aqueous solution containing phosphate, silicate, or tartrate ions, or combinations thereof. This treatment results in a decreased power consumption during anodization and produces a film having higher film capacitance.

10 Claims, No Drawings

TREATING ETCHED ALUMINUM ELECTROLYTIC CAPACITOR FOIL

BACKGROUND OF THE INVENTION

This invention relates to a method by which the capacitance of aluminum electrolytic capacitor foil is increased by treating the foil prior to anodization with boiling water and then with a boiling aqueous solution containing phosphate, silicate, or tartrate ions, or combinations thereof.

It is known that hydrous oxide films can be formed on aluminum by treating the foil with boiling water and that anodization after such treatment consumes less charge than does anodization of untreated foil. Furthermore, the film formed thereby has significantly higher capacitance than a normal barrier oxide film formed on untreated aluminum.

Several of the additives claimed have usefulness in the capacitor industry for a variety of other purposes such as passivation of capacitor foils, removal of impurities, stripping of excess hydrate, protection against effects of moisture, etc., among them phosphates, silicates, and tartrates.

SUMMARY OF THE INVENTION

This invention features the formation of a hydrous oxide film on aluminum electrolytic capacitor foil and modification of this film whereby capacitance is enhanced in subsequent anodization. Power consumption is also reduced relative to foil which has only been immersed in boiling water without subsequent film modification.

While the present invention is useful across the entire range of anodization voltages normally utilized in electrolytic capacitor technolgy, special care must be taken in the case of very low voltage anodization to limit the amount of hydrous oxide formed in the first step of the process for two reasons:

(1) excessively long reaction times result in reduced surface area brought about by consumption of the very fine etch structure of such foil by the reaction, and (2) excess hydrous oxide thickness formed by longer reaction times tends to block off etch tunnels and thus reduces available capacitance.

The hydrous oxide layer is formed by immersing the foil in boiling water to form an appropriate thickness of film. The foil is then immersed in a boiling aqueous solution containing a phosphate, silicate, or tartrate. This second step modifies the hydrous oxide so that upon anodization, a further reduction in charge is achieved and a film is produced with even higher capacitance.

The various additive anions are effective in different pH ranges. For silicate solutions, the optimum range is between pH 7 and 12 but preferably 10-11. The appropriate solution can be prepared by neutralizing a strongly basic solution of sodium silicate with an acid containing an anion compatible with ordinary aluminum anodizing procedures. Phosphate and tartrate are the preferred ones.

With phosphate solutions pH should be between 5 and 10 and preferably 5-7, while with tartrate the pH should be between 7 and 9. These solutions are easily prepared by neutralizing solutions of the respective acids with a base containing a cation from Groups I or II of the periodic table (or ammonium ion). Bases containing heavy metal cations are not suitable due to their tendency to contaminate aluminum foil by plating onto the foil surface.

DESCRIPTION OF THE PREFERRED EMBODIMENTS

A hydrous oxide film is formed on aluminum capacitor foil by immersing the foil in boiling water for an appropriate time. For low-voltage foil, the immersion period may be as short as 15 seconds, and for high-voltage foil a period of as much as 15 or 20 minutes may be required. The immersion period is a function of the etch structure primarily, with shorter times being used with a fine etch structure (fine, narrow tubes) and longer times with more open or coarse etch structures. The longest immersion time is used for the coarsest etch structure, that associated with foil for high voltage use.

The hydrous oxide film is next modified by immersing the foil in a boiling aqueous solution of a phosphate of pH 5-7 or of silicate of pH 7-12, and preferably 10-11, or of tartrate of pH 7-9. The preferred neutralizing agents for the sodium silicate solution are tartaric acid or phosphoric acid. Neutralizing of tartaric acid or phosphoric acid is best accomplished with sodium or potassium hydroxide. Reaction time for this second step is 2-12 minutes, and preferably 6-8 minutes.

EXAMPLE 1

This example shows results for hydrous film modification accomplished with a 10 g/l sodium silicate solution. In each case anodizations were performed on etched aluminum foil at 60 V and silicate immersions were 7.5 minutes.

Table 1

| Treatment | Capacitance Increase Over Untreated Foil (%) |
|---|---|
| 30-second water boil (no silicate treatment) | 4 |
| Silicate treatment only (no water boil) | 0 |
| Water boil + silicate immersion | 17 |

While a slight improvement in capacitance results from the use of the water boil alone, a much greater capacitance results when the water boil is followed by a silicate immersion.

EXAMPLE 2

The effect of a 30-second boiling water treatment followed by a 7.5-minute treatment in an aqueous boiling phosphate solution at the various pH levels was determined using etched foil designed for low voltage application. Anodizations were performed at 100 V.

Table 2

| Treatment | Capacitance Increase (%) |
|---|---|
| Water boil only | 2.5 |
| *Water boil + phosphate, pH 5 | 10.7 |
| *Water boil + phosphate, pH 7 | 9.9 |
| *Water boil + phosphate, pH 11 | −5.3 |

*(1 g/l H$_3$PO$_4$ neutralized with NaOH)

EXAMPLE 3

Anodization times for untreated etched foil, water-boiled only, and water-boiled+phosphate-treated etched foil are compared in this example. Charge savings for water boil+phosphate compared with untreated foil are given below for various formation voltages. A 30-second immersion was used for water boil only and for water boil+phosphate. The phosphate immersion was carried out for 5 minutes. Anodization was performed at 57 ma/cm$^2$.

Table 3

| Formation Voltage | Time (seconds) to Reach indicated voltage | | | Charge Savings Over Untreated Foil (%) | |
|---|---|---|---|---|---|
| | Un-treated | Water Boil Only | Water Boil + Phosphate | Water Boil Only | Water Boil + Phosphate |
| 20 | 32 | — | 24 | — | 25 |
| 50 | 183 | — | 161 | — | 12 |
| 100 | 359 | 317 | 280 | 12 | 22 |
| 150 | 478 | 414 | 365 | 13 | 24 |
| 200 | 557 | 479 | 398 | 14 | 29 |
| 400 | 656 | 606 | 445 | 8 | 32 |

These data show that significant charge savings, and therefore reduction in power consumption, above and beyond that achieved by the use of a water boil alone, can be realized in the 20–400 V range by the use of the present invention.

EXAMPLE 4

In this example a comparison is made between untreated etched foil and etched foil that has been immersed in boiling water 15 seconds reaction time followed by immersion in a boiling solution of 10 g/l of sodium silicate neutralized to pH 10.9 by tartaric acid.

Table 4

| Formation Voltage | Capacitance ($\mu$f/in$^2$) | | | Capacitance Increase Over Untreated Foil (%) | |
|---|---|---|---|---|---|
| | Un-treated | Water Boil Only | Water Boil + Silicate | Water Boil Only | Water Boil + Silicate |
| 50 | 51.18 | 52.20 | 56.96 | 2.0 | 11.3 |
| 100 | 19.34 | 19.72 | 23.83 | 2.0 | 23.2 |

Thus, capacitance can be increased and power consumption during anodization reduced by the process of the present invention.

What is claimed is:

1. Aluminum electrolytic capacitor foil is treated prior to anodization in a two-step process comprising contacting said foil with boiling water and then contacting said foil with a boiling aqueous solution containing ions chosen from the group consisting of phosphate, tartrate, silicate, and combinations thereof, whereby a hydrous oxide film formed in the first step is modified by interaction with said ions of the second-step so that capacitance is enhanced and power consumption reduced in subsequent anodization.

2. A process according to claim 1 wherein said foil is etched foil.

3. A process according to claim 1 wherein said boiling water contacting is carried out for 15 seconds to 20 minutes.

4. A process according to claim 2 wherein said boiling water contacting time is carried out for 15 seconds for foil having a fine etch structure and increases to 20 minutes for the coarsest etch structure.

5. A process according to claim 1 wherein said second step solution contains phosphate ions and has a pH of 5–10.

6. A process according to claim 1 wherein said second step reaction time is 2 to 12 minutes.

7. A process according to claim 6 wherein said second step is carried out for 6 to 8 minutes.

8. A process according to claim 1 wherein said second step solution is a silicate solution partially neutralized to pH 7–12 by acidic material compatible with aluminum electrolytic capacitors.

9. A process according to claim 8 wherein said pH is 10–11 and said compatible material is a tartrate.

10. A process according to claim 1 wherein said second step solution is a tartrate solution and has a pH of 7–9.

* * * * *